UNITED STATES PATENT OFFICE 2,591,587

TRI-ALKENYL BENZENE

David T. Mowry, Dayton, Ohio, assignor to Monsanto Chemical Company, St. Louis, Mo., a corporation of Delaware No Drawing. Application June 30, 1948,
Serial No. 36,282

8 Claims. (Cl. 260—669)

This invention relates to new chemical compounds and a useful method for their preparation from readily available raw materials. More specifically the invention relates to new unsaturated hydrocarbons useful as cross-linking agents in olefinic copolymer preparation.

Divinylbenzene is known to exist in three isomeric forms, but commercially available divinylbenzene is prepared by dehydrogenation of mixtures of diethylbenzenes. The product is a mixture of all three divinylbenzenes with impurities and diluents which are exceedingly difficult to remove. With careful distillation at reduced pressures and in the presence of inhibitors it is possible to obtain a concentrate with about 40 percent of divinylbenzene contaminated with ethylvinylbenzenes, diethylbenzenes and other by-products. Furthermore, the divinylbenzene mixture polymerizes very rapidly due to the presence of some para-divinylbenzene, which polymerizes more rapidly than styrene because of the activating influence of a second vinyl group in the para- position. Although pure ortho-, para-, or para-divinylbenzenes can be prepared, these preparations involve tedious and expensive syntheses, which are not industrially practicable.

The primary purpose of this invention is to provide a pure, more efficient cross-linking agent which is more stable to storage because of the lower rate of its polymerization. A further purpose of this invention is to provide a substituted benzene which has a multiple cross-linking effect by reason of the presence of more than two polymerizable groups. A further purpose of this invention is to provide a practicable method of preparing benzene with polymerizable groups substituted in the 1, 3 and 5 positions.

The new compositions may be represented by the following formula:

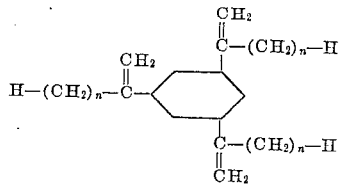

wherein $n$ is either zero (0) or one (1). Thus, 1,3,5-trivinylbenzene or 1,3,5-triisopropenylbenzene may be prepared by the new method which involves dehydrating the corresponding carbinols, having the general formula:

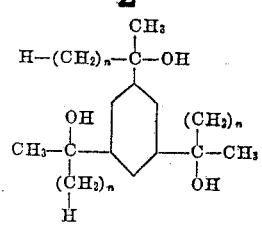

wherein $n$ is equal to zero (0) or one (1).

The carbinols are prepared by different reactions from 1,3,5-triacetylbenzene, the 1,3,5-tris-($\alpha$-hydroxyethyl) benzene by hydrogenation and the 1,3,5-tris($\alpha$-hydroxyisopropyl) benzene by the Grignard synthesis using three mol proportions of methyl magnesium bromide.

In application Serial No. 36,261, filed June 30, 1948, by David T. Mowry, there are described and claimed the 1,3,5-tris($\alpha$-hydroxyethyl) benzene and a method for its preparation from triacetylbenzene by hydrogenation.

The tris($\alpha$-hydroxyalkyl) benzenes are readily dehydrated by heating at temperatures between 200 and 500° C. in the presence of a suitable dehydration catalyst, such as alumina, silica, thoria, phosphorus acid on silica gel, silicyl phosphate, basic aluminum sulfate, boron phosphate, zirconia and the like. The reaction is preferably conducted by passing the raw material through a packed tube, or other retort, and rapidly withdrawing the dehydrated products and condensing them in a refrigerated receiver. Trivinylbenzene or triisopropenylbenzene is obtained in substantial yields and in high concentration. Further purification and concentration can be effected by simple distillation, preferably in the presence of a polymerization inhibitor. Other dehydration methods can be used, for example distillation of the tricarbinol over potassium acid sulfate or sodium acid sulfate.

The new unsaturated compounds are capable of polymerization and are particularly useful in the preparation of copolymers. Normally thermoplastic polymers may be cross-linked by means of small amounts of the triolefin and infusible and the insoluble products thereby produced are useful in the preparation of ion exchange resins. The new compounds may be used in place of divinylbenzene in any of its conventional applications, for example to modify properties of synthetic rubber, or to improve the drying and bodying properties of drying oils in coating compositions.

Further details of the practice of this invention are set forth with respect to the following specific examples.

Example 1

One hundred and three parts of 1,3,5-tris(α-hydroxyethyl)benzene, M. P. 133–134° C., prepared from 1,3,5-triacetylbenzene by catalytic hydrogenation, was dissolved in 185 parts of dioxane. This was slowly dropped into the top of a stainless steel reaction tube one inch in diameter and 40 inches long packed with 4 to 8 mesh activated alumina. The tube was maintained at 350±5° C. by means of an electrically heated thermostatically controlled sodium nitrite-sodium nitrate bath. A reduced pressure of 100 mm. of mercury was maintained in the system. The effluent vapors of 1,3,5-trivinylbenzene coming from the bottom of the tube was condensed in an ice-cooled receiver. The product was washed with water to remove the dioxane and rapidly distilled under reduced pressure to give a 70 percent yield of 1,3,5-trivinylbenzene, having a 90 percent minimum purity as determined by a bromide-bromate titration for unsaturation. Simple refractionation through a two-foot Vigreux column gave purer material, B. P. 84–86° (1–5 mm.), which was shown to have a minimum purity of 97 percent. 1,3,5-trivinylbenzene was less rapidly polymerized by heat than p-divinylbenzene and considerably smaller losses by polymerization were encountered during the distillation.

Example 2

The cross-linking efficacy of 1,3,5-trivinylbenzene was determined by dissolving small amounts in monomeric styrene and thereafter polymerizing the mixtures in the presence of 0.1 percent of benzoyl peroxide at 100° C. for 48 hours. It was found that 0.02 percent or more of the trivinylbenzene produced a cross-linked product insoluble in benzene. Similar experiments with pure p-divinylbenzene were conducted and it was found that a minimum concentration of 0.04 percent was necessary to produce a benzene insoluble cross-linked product. Similarly, 0.10 percent of a concentrate of a commercially available divinylbenzene analyzing 34 percent divinylbenzene, 58 percent ethylvinylbenzene and 7 percent diethylbenzene was required to produce the same effect. Accordingly, it will be seen that the cross-linking efficacy of the trivinylbenzene is approximately twice that of pure divinylbenzene and five times that of the commercial divinylbenzene concentrate.

In another series of experiments three solutions were prepared consisting of 7.72 grams of styrene, 7.28 grams of acid-free maleic anhydride and 0.0375 gram of benzoyl peroxide in 135 grams of nitration grade benzene. To the second solution was added 0.04 percent pure p-divinylbenzene and to the third solution 0.04 percent 1,3,5-trivinylbenzene (percentages based on the total reacting monomers only). The three solutions were placed in glass bottles, flushed with carbon dioxide gas and tumbled at 75° C. for twenty hours. The resultant copolymers of styrene, maleic anhydride and polyvinylbenzene were digested in benzene, filtered and dried in a vacuum oven.

The viscosities of the three products were determined in 0.2 percent aqueous solution of a pH of 5.5 at 25° C. using a Stormer viscosimeter equipped with a 50 gram weight. The viscosity of the styrene-maleic anhydride copolymer containing no cross-linking agent had a viscosity of 11.5 centipoises. The copolymer prepared in the presence of 0.04 percent p-divinylbenzene had a viscosity of 26.7 centipoises while the copolymer prepared in the presence of 0.04 percent 1,3,5-trivinylbenzene had a viscosity of 35.7 centipoises. Thus, it is seen that 1,3,5-trivinylbenzene is markedly superior to p-divinylbenzene in causing an increase in the viscosity of styrene-maleic anhydride copolymers.

Although the invention has been described with respect to specific embodiments, it is not intended that the details thereof shall be construed as limitations upon the scope of the invention except to the extent incorporated in the following claims.

I claim:

1. A compound having the structural formula:

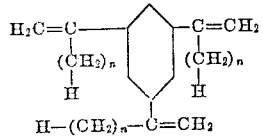

wherein $n$ is a whole number from zero (0) to one (1), inclusive.

2. 1,3,5-trivinylbenzene.
3. 1,3,5-triisopropenylbenzene.
4. A method of preparing trialkenylbenzene which comprises dehydrating compounds having the structural formula:

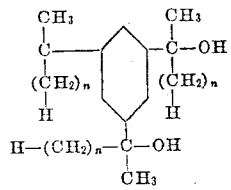

wherein $n$ is a whole number from zero (0) to one (1), inclusive, and recovering the trialkenylbenzene.

5. A method of preparing 1,3,5-trivinylbenzene which comprises dehydrating 1,3,5-tri(α-hydroxyethyl)benzene by heating in the presence of a catalyst, and recovering the trivinylbenzene.

6. A method of preparing 1,3,5-triisopropenylbenzene which comprises dehydrating 1,3,5-tri(α-hydroxyisopropyl)benzene by heating in the presence of a catalyst, and recovering the triisopropenylbenzene.

7. A method of preparing 1,3,5-trivinylbenzene which comprises heating 1,3,5-tri(α-hydroxyethyl)benzene in the presence of a dehydration catalyst, and separating the trivinylbenzene by distillation in vacuo.

8. A method of preparing 1,3,5-triisopropenylbenzene which comprises heating 1,3,5-tri(α-hydroxyisopropyl)benzene in the presence of a dehydration catalyst, and separating the triisopropenylbenzene by distillation in vacuo.

DAVID T. MOWRY.

REFERENCES CITED

The following references are of record in the file of this patent:

UNITED STATES PATENTS

| Number | Name | Date |
|---|---|---|
| 2,390,368 | Hochwalt | Dec. 4, 1945 |
| 2,427,337 | Abbott, Jr., et al. | Sept. 16, 1947 |
| 2,443,217 | Amos et al. | June 15, 1948 |
| 2,465,486 | Rosenthal | Mar. 29, 1949 |
| 2,542,551 | McKeever et al. | Feb. 20, 1951 |

OTHER REFERENCES

Pfeiffer et al., Annalen, vol. 460, 155 (1928).